US007957649B2

(12) United States Patent
Dybsetter et al.

(10) Patent No.: US 7,957,649 B2
(45) Date of Patent: Jun. 7, 2011

(54) MODULE COMMAND INTERFACE FOR AN OPTICAL TRANSCEIVER

(75) Inventors: Gerald L. Dybsetter, Scotts Valley, CA (US); Luke M. Ekkizogloy, San Jose, CA (US); Jayne C. Hahin, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 813 days.

(21) Appl. No.: 11/288,625

(22) Filed: Nov. 29, 2005

(65) Prior Publication Data

US 2006/0115276 A1 Jun. 1, 2006

Related U.S. Application Data

(60) Provisional application No. 60/631,444, filed on Nov. 29, 2004.

(51) Int. Cl.
*H04B 10/00* (2006.01)
(52) U.S. Cl. .................. 398/135; 398/136; 398/138
(58) Field of Classification Search .......... 398/135–139
See application file for complete search history.

(56) References Cited

U.S. PATENT DOCUMENTS

| 3,909,791 | A | 9/1975 | van den Berg |
| 4,330,870 | A | 5/1982 | Arends |
| 5,550,666 | A | 8/1996 | Zirngibl |
| 5,778,218 | A | 7/1998 | Gulick |
| 5,845,077 | A | 12/1998 | Fawcett |
| 5,956,168 | A | 9/1999 | Levinson et al. |
| 6,449,075 | B1 | 9/2002 | Watson et al. |
| 6,735,731 | B2 | 5/2004 | Ewen et al. |
| 6,862,322 | B1 | 3/2005 | Ewen et al. |
| 7,080,245 | B2 | 7/2006 | Ballard et al. |
| 7,146,412 | B2 | 12/2006 | Turnbull |
| 7,215,891 | B1 * | 5/2007 | Chiang et al. ............ 398/137 |
| 7,269,191 | B2 | 9/2007 | Stewart et al. |
| 2002/0112070 | A1 | 8/2002 | Ellerbrock et al. |
| 2002/0176138 | A1 | 11/2002 | Schlanger |
| 2003/0002108 | A1 | 1/2003 | Ames et al. |
| 2003/0053170 | A1 * | 3/2003 | Levinson et al. ............ 359/152 |
| 2004/0017794 | A1 | 1/2004 | Trachewsky |
| 2004/0022537 | A1 | 2/2004 | Mecherle et al. ............ 398/41 |
| 2004/0052528 | A1 | 3/2004 | Halgren et al. |

(Continued)

FOREIGN PATENT DOCUMENTS

JP 59110227 6/1984

OTHER PUBLICATIONS

U.S. Appl. No. 11/256,498, filed Oct. 21, 2005, Jayne C. Hahin.
U.S. Appl. No. 11/256,329, filed Oct. 21, 2005, Luke M. Ekkizogloy.

(Continued)

*Primary Examiner* — Dzung D Tran
(74) *Attorney, Agent, or Firm* — Maschoff Gilmore & Israelsen

(57) ABSTRACT

An operational optical transceiver (or transmitter or receiver) configured to contain a module command interface. The optical transceiver includes at least one processor, a memory location dedicated for high level commands, and a library of microcode that control specific optical transceiver operations. A high level command is written to the memory location dedicated for high level commands. The processor determines that the high level command has been written to the memory location, identifies what the command is, and executes microcode from the microcode library that corresponds to the high level command. The executed microcode causes the optical transceiver to perform the operation directed by the high level command.

20 Claims, 2 Drawing Sheets

U.S. PATENT DOCUMENTS

2004/0202476 A1* 10/2004 Woolf et al. .................. 398/135
2004/0260798 A1   12/2004 Addington et al.
2005/0031352 A1*  2/2005 Light et al. .................... 398/135
2005/0044335 A1   2/2005 Bee et al.
2005/0169585 A1*  8/2005 Aronson et al. ................ 385/89

OTHER PUBLICATIONS

U.S. Appl. No. 11/256,290, filed Oct. 21, 2005, Gerald L. Dybsetter.

U.S. Appl. No. 11/119,447, filed Apr. 29, 2005, Gerald L. Dybsetter et al.

* cited by examiner

MODULE COMMAND INTERFACE FOR AN OPTICAL TRANSCEIVER

CROSS-REFERENCE TO RELATED APPLICATIONS

This application claims the benefit of U.S. Provisional Application No. 60/631,444, filed Nov. 29, 2004, which is incorporated herein by reference in its entirety.

BACKGROUND OF THE INVENTION

1. The Field of the Invention

The present invention relates generally to optical transceivers. More specifically, the present invention relates to optical transceivers with a dedicated memory location that functions as a module command interface for writing high-level commands.

2. The Relevant Technology

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed there through, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to perform various operations with respect to certain parameters of a data signal received by the optical receiver. A controller circuit (hereinafter referred to the "controller") controls the operation of the laser driver and post amplifier.

Controllers are typically implemented in hardware as state machines. Their operation is fast, but inflexible. Being primarily state machines, the functionality of the controller is limited to the hardware structure of the controller. What would be advantageous are controllers that have more flexible functionality.

BRIEF SUMMARY OF THE INVENTION

The forgoing problems with the prior state of the art are overcome by the principles of the present invention, which relate to an optical transceiver that is configured to contain a module command interface. The optical transceiver includes a processor, a memory, and a microcode function library.

The memory, which may be any type of volatile or non-volatile memory, includes a high level command memory location dedicated for high level commands. A high level command is written to the dedicated high level command location. The processor determines that a command has been written by either polling the dedicated memory location or by receiving an interrupt that is generated when the command is written.

The processor then identifies the high level command. If it is a command the processor recognizes, then the processor will execute a microcode portion from the microcode function library that corresponds to the high level command. For example, if the high level command is a command to perform a diagnostic, the processor will execute the microcode portion that will cause the optical transceiver to perform the diagnostic. On the other hand, if the processor does not recognize the command, it will report this to a host computing system that is connected to the optical transceiver.

According, the principles of the present invention provide for a single module command interface that may serve multiple high-level commands. The module command interface removes the need to have a different memory location mapped to each specific high level command. This saves valuable memory for other transceiver purposes, especially when adding new operational features to the optical transceiver.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The principles of the present invention relate to an operational optical transceiver (or transmitter or receiver) configured to contain a module command interface. The optical transceiver includes at least one processor, a memory location dedicated for high level commands, and a library of microcode that control specific optical transceiver operations. A high level command is written to the memory location dedicated for high level commands. The processor determines that the high level command has been written to the memory location, identifies what the command is, and executes microcode from the microcode library that corresponds to the high level command. The executed microcode causes the optical transceiver to perform the operation directed by the high level command. An example operational optical transceiver environment will first be described. Then, the operation in accordance with the invention will be described with respect to the operational environment.

Figure 1:
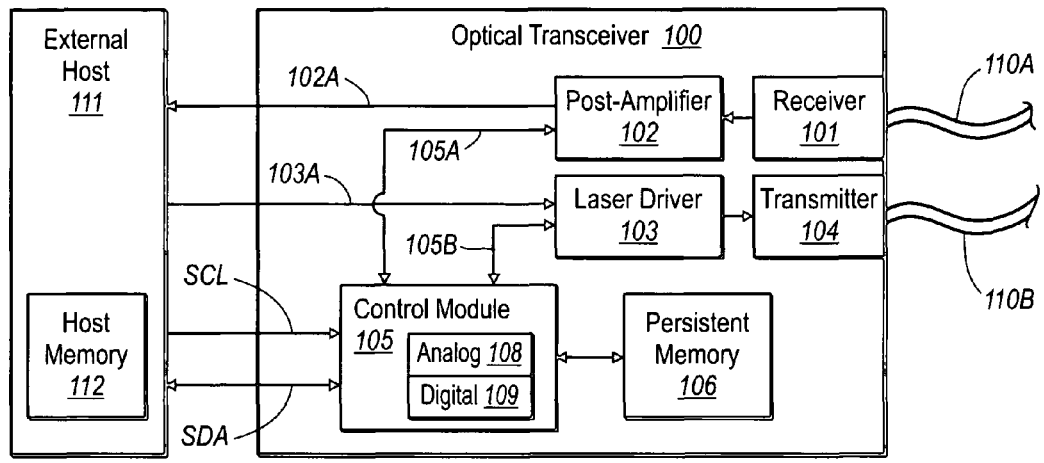
FIG. 1 schematically illustrates an example of an optical transceiver that may implement features of the present invention.

FIG. 1 illustrates an optical transceiver 100 in which the principles of the present invention may be employed. While the optical transceiver 100 will be described in some detail, the optical transceiver 100 is described by way of illustration only, and not by way of restricting the scope of the invention. The principles of the present invention are suitable for 1 G, 2 G, 4 G, 8 G, 10 G and higher bandwidth fiber optic links. Furthermore, the principles of the present invention may be implemented in optical (e.g., laser) transmitter/receivers of any form factor such as XFP, SFP and SFF, without restriction. Having said this, the principles of the present invention are not limited to an optical transceiver environment at all.

The optical transceiver 100 receives an optical signal from fiber 110A using receiver 101. The receiver 101 acts as an opto-electric transducer by transforming the optical signal into an electrical signal. The receiver 101 provides the resulting electrical signal to a post-amplifier 102. The post-amplifier 102 amplifies the signal and provides the amplified signal to an external host 111 as represented by arrow 102A. The external host 111 may be any computing system capable of communicating with the optical transceiver 100. The external host 111 may contain a host memory 112 that may be a volatile or non-volatile memory source. In one embodiment, the optical transceiver 100 may be a printed circuit board or other components/chips within the host 111, although this is not required.

The optical transceiver 100 may also receive electrical signals from the host 111 for transmission onto the fiber 110B. Specifically, the laser driver 103 receives the electrical signal as represented by the arrow 103A, and drives the transmitter 104 (e.g., a laser or Light Emitting Diode (LED)) with signals that cause the transmitter 104 to emit onto the fiber 110B optical signals representative of the information in the electrical signal provided by the host 111. Accordingly, the transmitter 104 serves as an electro-optic transducer.

The behavior of the receiver 101, the post-amplifier 102, the laser driver 103, and the transmitter 104 may vary dynamically due to a number of factors. For example, temperature changes, power fluctuations, and feedback conditions may each affect the performance of these components. Accordingly, the optical transceiver 100 includes a control module 105, which may evaluate temperature and voltage conditions and other operational circumstances, and receive information from the post-amplifier 102 (as represented by arrow 105A) and from the laser driver 103 (as represented by arrow 105B). This allows the control module 105 to optimize the dynamically varying performance, and additionally detect when there is a loss of signal.

Specifically, the control module 105 may counteract these changes by adjusting settings on the post-amplifier 102 and/or the laser driver 103 as also represented by the arrows 105A and 105B. These settings adjustments are quite intermittent since they are only made when temperature or voltage or other low frequency changes so warrant. Receive power is an example of such a low frequency change.

The control module 105 may have access to a persistent memory 106, which in one embodiment, is an Electrically Erasable and Programmable Read Only Memory (EEPROM). The persistent memory 106 and the control module 105 may be packaged together in the same package or in different packages without restriction. Persistent memory 106 may also be any other non-volatile memory source.

Figure 2:
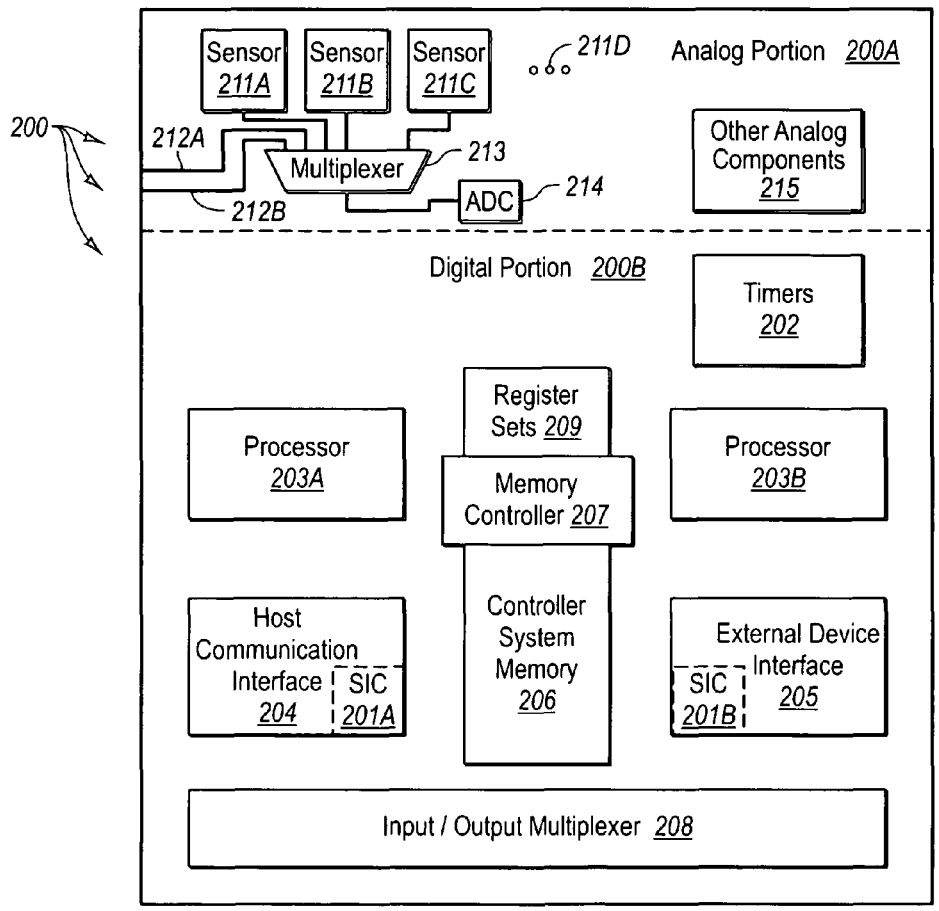
FIG. 2 schematically illustrates an example of the control module of FIG. 1.

The control module 105 includes both an analog portion 108 and a digital portion 109. Together, they allow the control module to implement logic digitally, while still largely interfacing with the rest of the optical transceiver 100 using analog signals. FIG. 2 schematically illustrates an example 200 of the control module 105 in further detail. The control module 200 includes an analog portion 200A that represents an example of the analog portion 108 of FIG. 1, and a digital portion 200B that represents an example of the digital portion 109 of FIG. 1.

For example, the analog portion 200A may contain digital to analog converters, analog to digital converters, high speed comparators (e.g., for event detection), voltage based reset generators, voltage regulators, voltage references, clock generator, and other analog components. For example, the analog portion 200A includes sensors 211A, 211B, 211C amongst potentially others as represented by the horizontal ellipses 211D. Each of these sensors may be responsible for measuring operational parameters that may be measured from the control module 200 such as, for example, supply voltage and transceiver temperature. The control module may also receive external analog or digital signals from other components within the optical transceiver that indicate other measured parameters such as, for example, laser bias current, transmit power, receive power, laser wavelength, laser temperature, and Thermo Electric Cooler (TEC) current. Two external lines 212A and 212B are illustrated for receiving such external analog signals although there may be many of such lines.

The internal sensors may generate analog signals that represent the measured values. In addition, the externally provided signals may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each signal may be periodically sampled in a round robin fashion using a single ADC such as the illustrated ADC 214. In this case, each analog value may be provided to a multiplexer 213, which selects in a round robin fashion, one of the analog signals at a time for sampling by the ADC 214. Alternatively, multiplexer 213 may be programmed to allow any order of analog signals to be sampled by ADC 214.

As previously mentioned, the analog portion 200A of the control module 200 may also include other analog components 215 such as, for example, digital to analog converters, other analog to digital converters, high speed comparators (e.g., for event detection), voltage based reset generators, voltage regulators, voltage references, clock generator, and other analog components.

The digital portion 200B of the control module 200 may include a timer module 202 that provides various timing signals used by the digital portion 200B. Such timing signals may include, for example, programmable processor clock signals. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host 111, possibly implemented using a two-wire interface such as I²C shown in FIG. 1 as the serial data (SDA) and serial clock (SCL) lines on the optical transceiver 100. Other host communication interfaces may also be implemented as well. Data may be provided from the control module 105 to the host 111 using this host communications interface to allow for digital diagnostics and readings of temperature levels, transmit/receiver power levels, and the like. The external device interface 205 is used to communicate with, for example, other modules within the optical transceiver 100 such as, for example, the post-amplifier 102, the laser driver 103, or the persistent memory 106.

The internal controller system memory 206 (not to be confused with the external persistent memory 106) may be Random Access Memory (RAM) or non-volatile memory. The memory controller 207 shares access to the controller system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as I²C or another interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the control module 200. Accordingly, there may be more input\output nodes within the control module 200 than there are pins available on the control module 200, thereby reducing the footprint of the control module 200.

Register sets 209 contain a number of individual registers. These registers may be used by the processors 203 to write microcode generated data that controls high speed comparison in optical transceiver 100. Alternatively, the registers may hold data selecting operational parameters for comparison. Additionally, the registers may be memory mapped to the various components of optical transceiver 100 for controlling aspects of the component such as laser bias current or transmit power.

Having described a specific environment with respect to FIGS. 1 and 2, it will be understood that this specific environment is only one of countless architectures in which the principles of the present invention may be employed. As previously stated, the principles of the present invention are not intended to be limited to any particular environment. Accordingly, the principles of the present invention relate to an optical transceiver that may be configured to contain a module command interface. The principles of the present invention will be discussed with reference to the environment described in relation to FIGS. 1 and 2.

Some optical transceivers have a module interface in which high-level operations are implemented by using different memory locations to initiate each high-level operation. In that case, there is a standard that maps a high-level command with a particular memory location. Any external component desiring to implement a high-level command would then write information to the specified internal memory location corresponding to the high-level command.

For example, if the user desired to perform the high-level operations of 1) having the transceiver report back the current operating temperature, and 2) initiating averaging (by reporting the average of the parameter measured over a time period), the user would write the appropriate two high-level commands to memory, with each high level-command being written to a different memory location defined by the standard. However, this uses up valuable memory space and requires the processor to poll all the memory locations that are dedicated to a high-level command to determine if a command has been written thereto. Since transceivers are fairly small and there is an incentive to create low cost transceivers, the amount of memory available in a typical transceiver may be relatively low. Accordingly, as the number of possible high-level commands increases, dedicating a memory location for each high-level command may quickly expense valuable memory resources.

The principles of the present invention make it possible to use one dedicated memory location for writing multiple high-level commands, instead of just the single high-level command. The standard then need only define the types of high-level commands that may be written to the dedicated memory location. When a command is written to the memory location, the processor would execute appropriate microcode for that high-level command.

As shown in FIG. 1, transceiver 100 may be communicatively couplable to host 111. In this description and in the claims, two entities are "communicatively couplable" if they are capable of being communicatively coupled with each other. In this description and in the claims, "communicatively coupled" is defined as being capable of communicating data either one way or bi-directionally. A keyboard or a mouse may be connected to host 111 through use of a serial or parallel port to facilitate user control of host 111 operational functions. Host 111 may also be equipped with a computer monitor or other display device.

Transceiver 100 contains a memory which includes at least one "high-level command memory location" dedicated for receiving multiple high-level command types. The memory may be any memory component capable of holding information such as, for example, a register of register sets 209, a flip-flop, RAM such as controller system memory 206, or any other type of memory device. The high-level command memory location, on the other hand, may be simply an address location within the memory.

Some examples of high level commands that may be written to the dedicated high-level command memory location are a command to report an operational parameter such as temperature or voltage, a command to initiate averaging of operational parameters, a command to initiate diagnostics of operational parameters, a command to communicate with a transceiver component such as the post-amplifier 102 or the laser driver 103, or any other command for which there is associated microcode that may be executed to implement the high-level command.

As mentioned previously, transceiver 100 may also contain a persistent memory 106. Persistent memory 106 may contain a microcode function library that consists of microcode portions, each microcode portion causing the transceiver 100 to perform a corresponding high-level function when executed by the processors 203. For example, suppose the high-level command is an inquiry for the current transceiver operating voltage. A microcode portion stored in persistent memory 106 would be structured to direct transceiver 100 to ascertain the operating voltage and to send this information to host 111 for user analysis. Alternatively, the microcode function library may be stored in host memory 112 or even in a remote storage location accessible over a wide area network such as the Internet. Optical transceiver 100 may access the microcode function library in host memory 112 or the remote storage location through the implemented host communication interface.

In some embodiments, the microcode function library and/or portion may be included with the high-level command. For example, if the high-level command is an inquiry for the current transceiver operating voltage, then the microcode portion for ascertaining the current operating voltage would be included with the high-level command.

Figure 3:
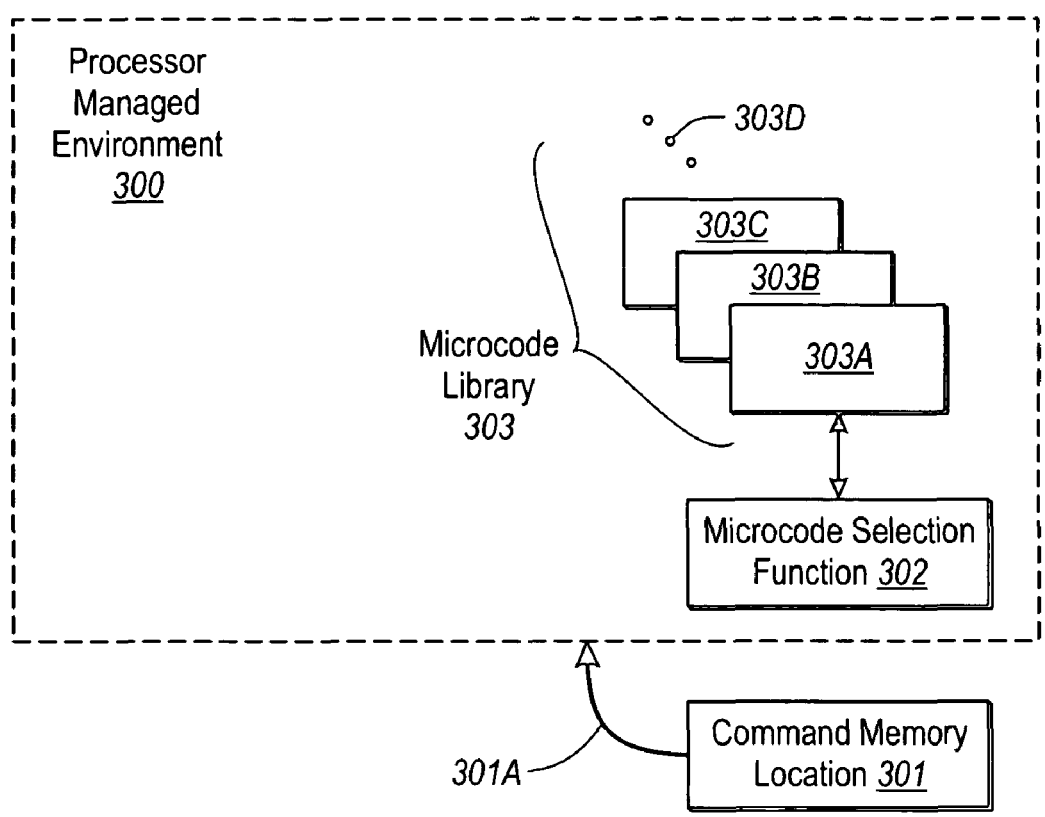
FIG. 3 schematically illustrates a function flow associated with performing a high-level command in accordance with the principles of the present invention.

FIG. 3 illustrates a function flow associated with performing a high-level command in accordance with the principles of the present invention. The process is initiated when a high level command is written to the high-level command memory location 301. As previously mentioned, any one of multiple high-level commands could have been written to the high-level command memory location 301.

Regardless of which high-level command is written to the high-level command memory location 301, the processor then determines the presence of a new high-level command as represented by the arrow 301A pointing the processor managed environment 300. The processor managed environment 300 is a conceptual notion that merely encompasses the microcode that would be accessible and executable by the processor(s). The processor(s) may determine (as represented by arrow 301A) through either polling or interrupts that a high-level command has been written. For example, the processor(s) may poll the memory location periodically to determine that a high level command has been written thereto. Alternatively, the processor(s) may receive an interrupt that is generated by a memory controller such as memory controller 207 or the memory itself.

Upon determining that the high level command had been written to the high-level command memory location 301, the processor(s) would access a microcode selection function 302. The microcode selection function 302 may be dedicated microcode that causes the processor(s) to select and access appropriate microcode from microcode library 303. The microcode library 303 corresponds to the microcode library discussed previously, and is illustrated as including microcode portions 303A, 303B, 303C amongst potentially others as represented by the ellipses 303D. For example, microcode portion 303A may be for inquiring as to the current voltage conditions of the transceiver and reporting to the host. If the high-level command was to perform just that, then the microcode selection function 302 would cause the processor to select microcode 303A. The processor(s) would then execute the microcode portion 303A, which would cause transceiver 100 to perform the desired operation. The processor(s) may also reset the command memory location 301 so that other commands may be written to the memory location.

A specific example will now be described with reference to FIGS. 1, 2 and 3. Suppose the dedicated high-level command memory location was located in a register of register sets 209. A user may direct host 111 through use of the attached keyboard to write a high level command to the high-level command memory location. Processors 203 may then poll the high-level command memory location to determine if a high level command has been written. Alternatively, an interrupt may be generated. For example, suppose the user entered a high level command to have transceiver 100 report its current operating temperature. During polling, processors 203 would read that a high level command to ascertain the current temperature had been written to the dedicated high-level command memory location in register sets 209. If the processors 203 recognized this high level command, they would access the microcode selection function described above. If, on the other hand, the high level command was not recognized, then processors 203 would communicate back to host 111 that the desired operation was not available.

Once processors 203 have determined that a high level command has been written, the microcode selection function would cause processors 203 to begin to access the appropriate microcode from the microcode library. In the current example, the processors may access persistent memory 106 and load a microcode portion that causes optical transceiver 100 to determine the current operating temperature into controller system memory 206. The processors would then execute this microcode. In other embodiments, the microcode portion that causes optical transceiver 100 to determine the current operating temperature may already be resident in the controller system memory 206. In this embodiment, processors 203 would simply execute the microcode. Either embodiment would cause transceiver 100 to determine the current temperature through use of a temperature sensor in sensors 211 and to report the temperature back to host 111 for user analysis.

On completion of the execution of the microcode, processors 203 may free memory that was associated with the microcode portion. The processors may also reset the high-level command memory location. This would allow other commands to be written to this location at a later time. If no command was later written to the high-level command memory location, then while polling processors 203 would continue to know that no new high level command had been written.

Accordingly, the principles of the present invention provide for a single module command interface that may serve multiple high-level commands. This removes the need to have a different memory location mapped to each specific high-level command. Instead, a single memory location is dedicated to receive all high level commands from the host. A user need only direct that available high-level commands be written to the memory location. The processors will then determine what the command is and execute microcode that will implement the command. This saves valuable memory for other transceiver purposes, especially when adding new operational features to the optical transceiver. Accordingly, the principles of the present invention represent a significant advancement in the art of optical transceivers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical transceiver communicatively coupleable to a host computing system, the optical transceiver comprising:
    an opto-electric receiver configured to receive a first optical data signal and convert the optical signal to a first electrical data signal;
    an electro-optical transmitter configured to receive a second electrical data signal from the host and convert the second electrical data signal to a second optical data signal;
    a first electrical interface configured to receive the second electrical data signal from the host;
    a second electrical interface configured to receive a high-level command directly from the host;
    at least one processor; and
    a memory that is configured to include a high-level command memory location dedicated for the high-level command,
    wherein the at least one processor is configured to perform the following:
        an act of determining that the high-level command has been written to the high-level command memory location;
        an act of identifying the high-level command; and
        an act of executing a microcode portion corresponding to the high-level command, the microcode portion being structured such that, when executed by the at least one processor, the optical transceiver is caused to fulfill a function corresponding to the high-level command.

2. An optical transceiver in accordance with claim 1, wherein the high-level command memory location is an address location within the memory.

3. An optical transceiver in accordance with claim 1, wherein the high-level command is one of a command to report an operational parameter, a command to initiate averaging of operational parameters, a command to initiate diagnostics of operational parameters, and a command to communicate with a transceiver component.

4. An optical transceiver in accordance with claim 1, wherein the microcode function library is contained in off-transceiver persistent memory.

5. An optical transceiver in accordance with claim 1, wherein the act of determining that the high-level command has been written to the high-level command memory location comprises:
    an act of the at least one processor polling the high-level command memory location.

6. An optical transceiver in accordance with claim 1, wherein the act of determining that the high-level command has been written to the high-level command memory location comprises:
    an act of the at least one processor receiving an interrupt.

7. An optical transceiver in accordance with claim 6, wherein the interrupt is generated by at least one of a memory controller and the high-level command memory location.

8. An optical transceiver in accordance with claim 1, wherein the act of selecting and accessing a microcode portion from a microcode function library is performed by executing dedicated microcode that, when executed by the at least one processor, causes the at least one processor to perform the act of selecting and accessing the microcode portion.

9. An optical transceiver in accordance with claim 1, wherein the at least one processor is further configured to perform:
    an act of resetting the high-level command memory location on completion of executing the microcode portion corresponding to the high-level command.

10. An optical transceiver in accordance with claim 1, wherein the at least one processor is further configured to perform:
    an act of notifying the host computing system if the at least one processor does not recognize the high-level command.

11. An optical transceiver in accordance with claim 1, wherein the optical transceiver performs the operation corresponding to the high-level command.

12. An optical transceiver in accordance with claim 1, wherein the optical transceiver is one of a 1G laser transceiver, a 2G laser transceiver, a 4G laser transceiver, a 8G laser transceiver, XFP laser transceiver, a SFP laser transceiver, or a SFF laser transceiver, and/or a 10G laser transceiver.

13. An optical transceiver in accordance with claim 1, wherein the second electrical interface includes two wires.

14. An optical transceiver in accordance with claim 13, wherein the data provided to the host includes digital diagnostics, readings of temperature levels, and/or transmit/receiver power levels.

15. An optical transceiver in accordance with claim 1, wherein the second electrical interface includes a serial data (SDA) and serial clock (SCL) lines.

16. An optical transceiver in accordance with claim 1, wherein the at least one processor is further configured to provide data to the host via the second electrical interface.

17. An optical transceiver in accordance with claim 1, wherein the at least one processor is further configured to write microcode to the memory.

18. An optical transceiver in accordance with claim 1, wherein the microcode function library is contained in an on-transceiver persistent memory.

19. An optical communications device communicatively coupleable to a host computing system, the optical communications device comprising:
    at least one processor; and
    a memory having a single address location that is dedicated for storing a plurality of different high-level commands,
    wherein the at least one processor is configured to perform the following:
        an act of determining that a high-level command has been written to the high-level command address location;
        an act of identifying the high-level command;
        an act of selecting and accessing a microcode portion from a microcode function library, the selected microcode portion corresponding to the high-level command; and
        an act of executing the microcode portion corresponding to the high-level command, the microcode portion being structured such that, when executed by the at least one processor, the optical transceiver is caused to fulfill a function corresponding to the high-level command.

20. An optical transceiver communicatively coupleable to a host computing system, the optical transceiver comprising:
    an opto-electric receiver configured to receive a first optical data signal and convert the optical signal to a first electrical data signal;
    an electro-optical transmitter configured to receive a second electrical data signal from the host and convert the second electrical data signal to a second optical data signal;

a first electrical interface configured to receive the second electrical data signal from the host;
a second electrical interface configured to receive a high-level command directly from the host;
at least one processor;
a memory that is configured to include a high-level command memory location dedicated for the high-level command,
wherein the at least one processor is configured to perform the following:
   an act of determining that the high-level command has been written to the high-level command memory location;
   an act of identifying the high-level command;
   an act of selecting and accessing a microcode portion from a microcode function library, the selected microcode portion corresponding to the high-level command; and
   an act of executing the microcode portion corresponding to the high-level command, the microcode portion being structured such that, when executed by the at least one processor, the optical transceiver is caused to fulfill a function corresponding to the high-level command.

* * * * *